United States Patent
Khalil et al.

[11] Patent Number: 5,824,160
[45] Date of Patent: Oct. 20, 1998

[54] METHOD FOR THE THERMO-CHEMICAL DEWAXING OF LARGE DIMENSION LINES

[75] Inventors: Carlos Nagib Khalil; Alberto Cunha Carneiro Da Silva; Celso Rodrigo De Souza; Maria Cristina Brum, all of Rio de Janeiro; Claudio Silvio Viana Martins, Niteroi; Sonia Maria Cabral De Menezes, Rio de Janeiro, all of Brazil

[73] Assignee: Petroleo Brasileiro S.A. Petrobras, Rio de Janeiro, Brazil

[21] Appl. No.: 742,126

[22] Filed: Oct. 31, 1996

[30] Foreign Application Priority Data

Nov. 22, 1995 [BR] Brazil ................................ 9505262-3
Nov. 29, 1995 [BR] Brazil ................................ 9505556-8

[51] Int. Cl.$^6$ .............................. B08B 7/00; B08B 9/00
[52] U.S. Cl. ........................ 134/5; 134/22.13; 134/22.12; 510/188
[58] Field of Search ................................ 510/188; 134/5, 134/19, 22.13, 22.12, 22.19, 35, 40; 149/74; 166/304, 302, 309, 305.1; 528/271

[56] References Cited

U.S. PATENT DOCUMENTS

| | | | |
|---|---|---|---|
| 4,219,083 | 8/1980 | Richardson et al. ............. | 166/300 |
| 4,285,720 | 8/1981 | Scher ............................... | 71/88 |
| 4,755,230 | 7/1988 | Ashton et al. .................... | 134/22.14 |
| 5,183,581 | 2/1993 | Khalil et al. ...................... | 252/8.552 |
| 5,639,313 | 6/1997 | Khalil ............................... | 134/18 |

FOREIGN PATENT DOCUMENTS 2276218  3/1993  United Kingdom .

OTHER PUBLICATIONS

J.W. Hill, et al. JACS 54, pp. 1569–1579 (1932), "Studies of Polymerization and Ring Formation, XIV. A Linear Superpolyanhydride and a Cyclic Dimeric Anhydride from Sebacic Acid".

J.W. Hill, et al. JACS 54, pp. 5023–5031 (1933), "Studies of Polymerization and Ring Formation, XIX. Many-Membered Cyclic Anhydrides".

*Primary Examiner*—W. Gary Jones
*Assistant Examiner*—Debra Shoemaker
*Attorney, Agent, or Firm*—Sughrue, Mion, Zinn, Macpeak & Seas, PLLC

[57] ABSTRACT

A method is provided for thermo-chemical dewaxing a large dimension line or conduit using a Nitrogen Generation System/Emulsion. The method involves introducing an emulsion into the conduit to be dewaxed. The emulsion comprises an internal aqueous phase and an external organic phase. The aqueous phase comprises an oxidizing nitrogen salt, a reducing nitrogen salt and water. The organic phase comprises a non-polar organic liquid, such as kerosine, and a delayed action activator for inducing the reaction of said oxidizing nitrogen salt and said reducing nitrogen salt. The delayed action activator may be a linear, aliphatic polyanhydride, such as poly(adipic anhydride). The emulsion is maintained in the conduit until the delayed action activator induces the reaction of the nitrogen salts to generate nitrogen and heat, thereby fluidizing wax in the conduit. The fluidized wax is then removed from the conduit. The emulsion may be prepared on a production platform or on nearby equipment. Well production may be resumed after the dewaxing treatment.

14 Claims, 6 Drawing Sheets

METHOD FOR THE THERMO-CHEMICAL DEWAXING OF LARGE DIMENSION LINES

FIELD OF THE INVENTION

The present invention relates to a thermo-chemical method for the dewaxing of hydrocarbon transmission conduits or lines, especially those having extensive length and large internal diameter. More specifically, the present invention relates to a thermo-chemical method for the dewaxing of hydrocarbon transmission conduits which are longer than 10 and up to 50,000 meters and whose internal diameter is larger than 4 and up to 12 inches or more. The method is especially useful when applied from a production platform or any equivalent equipment. The method uses a treating fluid made from a water/oil emulsion which contains in its internal, aqueous phase, nitrogen- and heat-generating nitrogen salts and in the external, organic phase, a delayed action activator, such as a polyanhydride, of controlled hydrodegradability which leads to a marked delay of the onset of the nitrogen- and heat-generation reaction. The thus-obtained extended delay allows the thermo-chemical dewaxing method to be applied to large dimension lines or conduits for which the conventional, prior art dewaxing methods are not well-suited.

Broadly considered, the present invention relates to a method and composition for fluidization and removal of paraffin deposits from a large dimension-hydrocarbon transmission conduit or line by combining thermal, chemical and mechanical effects provided for simultaneously by the emulsified dewaxing fluid, whereby the paraffin deposit is placed in intimate contact with not only the hydrocarbon solvent which makes up the external phase of the emulsion but also the heat and nitrogen chemically generated by the nitrogen reagents present in the internal, aqueous phase of the emulsion.

BACKGROUND OF THE INVENTION

U.S. Pat. No. 5,183,581, herein fully incorporated by reference, teaches the use of a Nitrogen Generating System/ Emulsion for the dewaxing of producing formations, whereby an increase in temperature is provided by the reaction of nitrogen salts combined in the presence of an organic solvent in the external phase of the emulsion to cause paraffin removal from the reservoir. The salts used are an oxidizing nitrogen salt and a reducing nitrogen salt.

According to GB-B-2276218, herein fully incorporated by reference and directed to the dewaxing of hydrocarbon conduits, aqueous solutions which contain selected nitrogen reactants are individually prepared in mixing tanks and then added, still individually, to adequate volumes of a hydrocarbon organic solvent designed to effect the dissolution of the specific kind of paraffin deposit found in the conduit or line. Also, dispersing agents and/or pour point depressants may be advantageously added to the thus prepared emulsions. The activation of the chemical reaction between the nitrogen reagents is effected with the aid of a solution of a weak organic acid such as acetic acid. The emulsion contains in its internal phase the nitrogen salt which is stable in the slightly acidic medium, having a pH between 3 and 6. The external phase is made up of an organic solvent or mixtures of organic solvents, especially hydrocarbon solvents. The breaking of the emulsion triggers a reaction to generate heat and nitrogen, which is termed the Nitrogen Generating System or SGN after the original Portuguese.

On the basis of the results of initial effective internal volume assessment of the conduit to be dewaxed, adequate volumes of the two emulsions are prepared which are simultaneously injected to the interior of the conduit, co-currently to the production flow by means of surface pumping systems. Support vessels comprise the terminals for injecting treating fluid at the inlet and for recovering the mixture of spent fluid and fluidized paraffin at the outlet.

The activation of the treating fluid is effected by means of acetic acid. The thus-prepared fluid is then pumped at maximum possible flowrate from the vessel installed upstream of the conduit being treated. The mixture of emulsions C (ammonium chloride) and N (sodium nitrite) produces, exclusively on flow, the Nitrogen Generating System, emulsified SGN. The emulsions are pumped at equal and constant flowrates while being displaced with the aid of a small bed of kerosene and seawater so as to place the fluid in the second half of the conduit. After the period of time that the fluid is left at rest so that it can effect the dissolution and removal of the paraffin deposit, the simultaneous pumping of emulsions C and N is resumed in order to treat the first half of the conduit. After another rest period the SGN treating fluid is withdrawn and the final internal effective volume is assessed in order to evaluate the efficacy of the treatment. Thus, the treating fluid using the Nitrogen Generating System works from downstream to upstream in the conduit to be dewaxed, the removal of the paraffin deposits being practically complete. However, as already stated before, the activation with acetic acid limits the use of this system to conduits of up to 4000 meters length and 4 inches internal diameter since the release of hydrogen ion is relatively quick and the emulsion is rapidly broken, and the nitrogen and heat generation reaction is initiated.

In spite of the excellent results in terms of paraffin removal obtained in the field by the technique set forth in GB-B-2276218, there are some drawbacks in the process which stem on the one hand from the relatively short time to the onset of the heat and nitrogen generating reaction which limits the length and diameter of the line to be dewaxed, and on the other hand, the high cost which derives from the use of support vessels where treating fluids are prepared and from where same are pumped to the line, this item representing nearly 70% of the overall cost of the process.

Thus, there is a need to develop a thermo-chemical process able to effect the dewaxing of highly-extended, high-volume hydrocarbon transmission conduits, and wherein the pumping of the treating fluid made up of one single aqueous solution of nitrogen salts could be effected from the production platform or from any equivalent equipment, this representing great savings. This would require that the onset of the reaction to generate heat and nitrogen be strongly delayed. Therefore, as described and claimed in the present application, the Applicant has developed a polyanhydride-based polymer matrix designed to have an extended delayed action in the activation of the chemical reaction of the Nitrogen Generation System as applied to the dewaxing of large dimension lines.

SUMMARY OF THE INVENTION

There is provided a method for the thermo-chemical dewaxing of a hydrocarbon transmission conduit containing paraffin deposit, said method comprising the steps of:

(a) introducing into said conduit an emulsion comprising an internal aqueous phase and an external organic phase, said aqueous phase comprising an oxidizing nitrogen salt, a reducing nitrogen salt and water, and said organic phase comprising a non-polar organic liquid, said emulsion comprising a delayed action activator for inducing the reaction of said oxidizing nitrogen salt and said reducing nitrogen salt, wherein said delayed action activator is a linear, aliphatic polyanhydride;

(b) maintaining said emulsion in said conduit under conditions sufficient to fluidize paraffin deposit and to generate nitrogen gas and heat from the reaction of said oxidizing nitrogen salt and said reducing nitrogen salt; and (c) removing the fluidized paraffin deposit from said conduit.

The present method is especially useful for thermo-chemical dewaxing of large dimension conduits of which one end is connected to a production platform. Prior to the dewaxing treatment, oil may be withdrawn from the conduit or line to be dewaxed. The treating fluid may be prepared in the production platform or any equivalent equipment and pumped into the line. The treating fluid contains the Nitrogen Generating System. The delayed action activator of the heat and nitrogen generation reaction is an aliphatic polyanhydride, such as the poly(adipic anhydride). The treating fluid is introduced into the conduit. After the period of time necessary for the treating fluid to effect the treatment, the spent fluids and the emulsified paraffin may be recovered and well production resumed.

Therefore, the present method provides a thermo-chemical process for the dewaxing of long, high-volume hydrocarbon transmission conduits by means of a heat and nitrogen generation reaction (SGN) which is activated by means of a polyanhydride of controlled hydrodegradability which conveys the suitable delay to the onset of the heat and nitrogen generation reaction.

The present method also provides a thermo-chemical dewaxing process which can be applied to large dimension conduits, for example, from 4000 and up to 50,000 meters length or more and of large volumetric capacity, for example, conduits of more than 4 and up to 12 or more inches in internal diameter, the process being run from a production platform or any equivalent equipment, thus, dispensing with the use of expensive support vessels.

The present method also provides a thermo-chemical process for the dewaxing of a long, large internal diameter conduit which is directly connected to a production platform or to another conduit connected to a tanker, or to any other kind of conduits connected together, to a production platform or to terminals.

DETAILED DESCRIPTION

In the process for preparing the polyanhydrides useful as delayed action activators in the chemical reaction of the SGN, the Applicant has developed a polymer matrix based on aliphatic anhydrides synthesized from the condensation of same or different diacids, the main feature of such matrix being the control of its hydrodegradability, this control being especially useful for the dewaxing process described herein. Mainly, it has been found that poly(adipic anhydride) of various molecular weights or its hydrodegradation products were activators able to convey long delaying periods to generate nitrogen and heat by chemical reaction. This delay enables the dewaxing of large dimension lines or conduits, that is, highly extended and/or high volumetric capacity lines.

A process for preparing the polyanhydrides to be used in the dewaxing process comprises the polycondensation reaction of a carboxylic diacid such as the adipic acid, in the presence of excess acetic anhydride under reflux temperature and constant agitation, so as to obtain the polyanhydride. The acetic acid, by-product of the reaction, and the excess acetic anhydride are withdrawn from the reaction medium by distillation under reduced pressure.

A preferred monomer for preparing the polyanhydride is adipic acid. However, other diacids may be used alone, in combination with each other or in combination with adipic acid. Examples of such diacids include glutaric acid, pimelic acid, suberic acid, azelaic acid, and sebacic acid.

The chemical equation (1) below summarizes a polymerization process of anhydrides, for example starting from adipic acid:

$$HOOC(CH_2)_4COOH + (CH_3CO)_2O \rightarrow$$

$$H[OOC(CH_2)_4CO]_nOH + CH_3COOH + (CH_3CO)_2O \qquad (1)$$

A process for polymerizing the anhydrides to be used as delayed action activators for the SGN reaction is derived from the original process as described by J. Hill and W. H. Carothers in the Journal of the American Chemical Society, vol 54 p. 1569 (1932) and vol 55, p. 5023 (1933). As the process described in these papers is aimed at hydrolytically stable polyanhydride products, the acetic acid by-product of the reaction, as well as the excess acetic anhydride, were removed from the reaction medium so as to produce a pre-polymer which was solid at ambient temperature. The pre-polymer contained, as impurities, non-converted or by-product dicarboxylic acids. The purification of the pre-polymer involved its solubilization in specific solvents, which do not dissolve the diacid; finally the pre-polymer was recrystallized and washed several times with ethers for the removal of traces of acetic acid and anhydride only then was the pre-polymer heated under vacuum at temperatures higher than 120° C. to effect the polymerization. Thus, the several steps of the Hill and Carothers process render it slow and expensive, the process steps being rather strict, for example, highly reduced pressures of the order of $10^{-6}$ mm Hg and several separation steps, which hinder its application at an industrial scale.

Industrial processes used in the preparation of polyanhydrides for biomedical applications involve, invariably, the isolation of pre-polymers, this step being of paramount importance for products of pharmacological grade.

Therefore, aiming specifically at a delayed action activator for SGN reactions, the Applicant has developed a process for preparing a composition of linear aliphatic polyanhydrides without purifying the pre-polymer. This process may take place in the absence of catalyst. The process is easily performed in an industrial scale.

The polyanhydride reaction activator may be prepared as a composition of linear polyanhydrides, as a batch, from the reaction of carboxylic diacids in the presence of an excess of acetic anhydride, whereby a pre-polymer is formed, under atmospheric pressure and reflux temperature. The pre-polymer is then cooled and reduced pressure is used to remove the acetic acid which is formed and the excess acetic anhydride. The temperature is then increased up to 100°–200° C. to effect polymerization. The polyanhydride product is kept in an organic solvent in order to avoid hydrolysis. Important parameters are the mole ratio of the feed, the reduced pressure, the temperature and the reaction time. By controlling these parameters, compositions of linear aliphatic anhydrides of controlled molecular weights particularly useful as delayed action activators in the SGN reaction can be prepared. The thus obtained polyanhydride compositions show distinct molecular weight ranges, which advantageously affects the hydrolytic degradation rates and the SGN reaction delay.

Controlled release of $H^+$ ion from the monomeric product is believed to result from the polyanhydride hydrolysis. The polyanhydride composition is insoluble in the organic as well as in the aqueous phase. However, the polyanhydride can be hydrolyzed at controlled rate with release of a $H^+$ ion which functions either as a catalyst or a pH modifier.

Although not bound to any particular theory, the Applicant theorizes that the mechanism of delayed activation of the SGN reaction consists initially of a step of migration of anhydride polymer from the organic phase to the aqueous phase of the emulsion. The slow step of the polymer hydrolysis occurs in the aqueous phase, with generation of the dicarboxylic acid corresponding to the monomer unit. Then the diacid is dissociated and $H^+$ ion is formed, thus, enabling the onset of the reaction to cause nitrogen generation with heat release. The following sequence of chemical reactions (2), (3), (4) and (5) illustrates steps of the theoretical mechanism of delayed activation of the SGN in the presence of an aliphatic polyanhydride such as poly(adipic anhydride).

1st STEP: POLYMER MIGRATION (OIL OR ORGANIC PHASE) (AQUEOUS PHASE)

2nd STEP: POLYMER HYDROLYSIS

3d STEP: DISSOCIATION OF ADIPIC ACID

4th STEP: ACTIVATION OF THE REACTION OF THE NITROGEN GENERATION SYSTEM $$H^+$$

PREFERRED MODES

The Applicant has developed a delayed action activator to be used in the reaction to generate nitrogen and heat. The activator is included in the emulsion which contains nitrogen salts, such as ammonium halides and alkali metal nitrites, especially ammonium chloride and sodium nitrite. The activator may be based on a poly(adipic anhydride) polymer matrix, which presents a slow hydrolysis rate pattern. This hydrolysis rate can be controlled from the process conditions used to prepare the polymer. Accordingly, the desired delay of the reaction to generate nitrogen and heat, believed to result from emulsion breaking and release of $H^+$ ion, can be precisely planned, to accommodate the length and internal diameter of the line to be dewaxed.

In the present specification and claims, please note the following meanings:

TREATING FLUID is the aqueous solution of reducing nitrogen salt and oxidizing nitrogen salt in equimolar stoichiometry emulsified in an organic solvent.

THE EMULSION is a water/oil emulsion where the internal phase is made up by the reducing nitrogen salt and oxidizing nitrogen salt and the external phase is the oil phase made up by the organic solvent.

DELAYED ACTION ACTIVATOR is the polyanhydride which is used to provide the desired delay in the onset of the heat- and nitrogen-generating reaction.

The thermo-chemical process for the dewaxing of long, high internal diameter lines may comprise:

withdrawing any hydrocarbon oil contained in the large dimension line to be dewaxed, one end of the line being connected to a production platform;

preparing and pumping from the platform into the large dimension line a treating fluid including an aqueous solution containing oxidizing nitrogen salt and reducing nitrogen salt in equimolar stoichiometry emulsified in an organic solvent, the emulsion generating nitrogen and heat inside of the line, with the control of the onset of the reaction to generate nitrogen and heat being maintained by a delayed action activator, which is an aliphatic polyanhydride, such as poly(adipic anhydride);

maintaining the treating fluid inside of the large dimension line for a period of time which is sufficient to fluidize the paraffin deposit;

after fluidization of the paraffin deposit, recovering the spent fluids and the emulsified paraffin;

resuming well production.

Therefore, differences of the present process as compared to the state-of-the-art process described in GB-B-2276218 are:

the delayed action activator of the reaction to generate nitrogen and heat, which is to be added to the organic phase of the emulsion, is an aliphatic polyanhydride, such as poly(adipic anhydride) of controlled hydrodegradability so that the hydrolysis rate and $H^+$ ion release can be varied to accommodate to the length and internal diameter of the line to be dewaxed;

the solution of nitrogen salts and the resulting emulsion can be prepared at the production platform itself, in a single tank, the solution being stabilized through the addition of NaOH to a pH of 7.0–7.5, the poly (adipic anhydride) activator being added to the emulsion of the nitrogen salts suspended in an organic solvent;

the pumping of the treating fluid does not require support vessels, the elimination of which resulting in cost reductions of up to 70%.

The sole restriction to preparing the treating fluid at the production platform is linked to the nature of the organic solvent to be employed as the hydrocarbon phase. As is well-known, the nature of the organic solvent or mixture of organic solvents to be used in the dewaxing fluid is a function of the nature of the paraffin deposit to be removed from the line. Thus, in the event that the best organic solvent is, for example, kerosene, for obvious safety reasons, the emulsion should not be prepared on the production platform, but rather on a support vessel.

The treating fluid employed in the present thermo-chemical process is basically made up of a solution of nitrogen salts, for example, ammonium chloride and sodium nitrite. This salt solution is emulsified in an organic solvent, preferably a non-hazardous organic solvent, such as maritime diesel and the like. As taught in U.S. Pat. No. 5,183,581 and GB-B-2276218, the solutions of nitrogen salts emulsified in an organic solvent are prepared in concentrations which optimize the production of nitrogen and heat according to the needed extent of dewaxing. The solution may have a concentration of between 3.0 and 4.5 molar for each of the nitrogen salts. Only one mixing tank is required for preparing the nitrogen salts solution. In order to stabilize the solution, pH may be kept between 7.0 and 7.5 with the aid of NaOH. The solution is emulsified in an organic solvent, such as aviation kerosene, maritime diesel, xylene or other organic solvents, chosen according to the kind and nature of the paraffin deposit to be fluidized.

The amount of treating fluid to be used in the present process may be determined on the basis of a mathematical simulation which calculates the content of deposited paraffin.

The internal volume of the line may be assessed with the aid of a bed of contrasting fluid, as described in GB-B-2276218.

The delayed action activator aliphatic polyanhydride may be poly(adipic anhydride). As is well known in the art, since hydrolysis rate is an inverse function of the polyanhydride molecular weight, a poly(adipic anhydride) of a molecular weight of the adequate hydrolysis rate may be chosen to control to the period or delay needed before the onset of the reaction to generate nitrogen and heat. Another factor in controlling the reaction delay is the concentration of aliphatic polyanhydride used, longer delays being obtained for lower concentrations of aliphatic polyanhydride. The activator may be used in a suspension between 10 and 20 weight % by volume in a non-polar organic solvent, in the amount from 0.4 and up to 1.5% by volume of the SGN-generating emulsion.

The performance of the dewaxing process may be monitored either by the measurement of the effective internal volume of the line after the dewaxing treatment as compared to the effective internal volume before the treatment, or by measuring the volume of the oil produced before and after the treatment.

Figure 6:
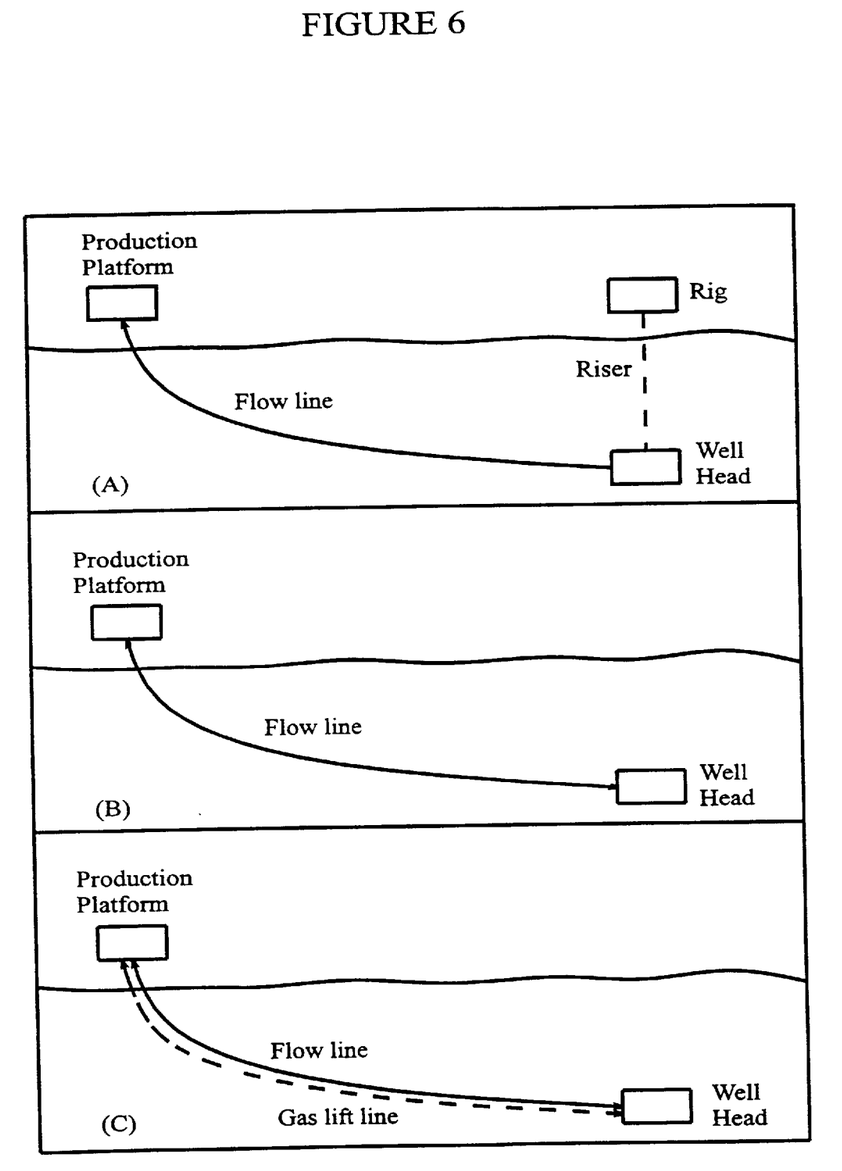
FIG. 6 provides a schematic illustration of three modes of the present invention. On FIG. 6, mode A, the line to be dewaxed is connected to the production platform and, through the well head, to a dynamic rig through which the treating fluids can be injected. On FIG. 6, mode B, the line to be dewaxed is connected to the production platform and to the well head. In mode B, the pumping of fluids would be introduced counter-currently to the direction of the oil flow. On FIG. 6, mode C, an auxiliary line, such as a gas lift line, makes possible the pumping of the treating fluids in the direction of the production flow.

The present thermo-chemical process may be effected according to three preferred modes, as illustrated on FIG. 6.

FIG. 6, mode A, shows a conduit or line to be dewaxed having one end attached to the production platform and the other end attached to the well head. The well head is, in turn, attached to a dynamic positioning rig by means of a riser. Alternatively, the rig may be replaced by a terminal or a monobuoy. This mode is referred to herein as the direct mode of the process. This direct mode may be used for treating transfer pipelines between platforms and terrestrial or maritime terminals. In the direct mode the master valve is shut in order to stop the oil flow. Oil present in the line is displaced in the direction of production by means of a seawater bed pumped from the rig, so as to bring the oil back to the production platform. Alternatively, as-produced gas can be used to displace the oil contained in the line back to the production platform. With the line emptied of oil, a previously prepared nitrogen salts emulsion, including a duly added amount and kind of a suitable aliphatic polyanhydride, such as poly(adipic anhydride), is pumped from the dynamic positioning rig into the line. The emulsified treating fluid is left inside the line to react for a sufficient period of time to fluidize the contents of the line, and thereafter the spent treating fluid is displaced from the line by means of seawater or a hydrocarbon such as a petroleum oil. If desired, the final internal volume may be assessed by means of a contrasting fluid, or the master valve may be opened in order to resume well production and the oil production may be measured after the treatment, as compared with the oil volume produced when the line was waxed.

Mode B of FIG. 6 shows a waxed line having one end attached to the production platform and the other end attached to a well head. According to this mode, the master valve is shut to stop oil production. The oil and gas remaining in the line is drained or withdrawn by spontaneous gas lift caused by the pressure from the light fractions of the oil. Draining ceases when the pressure in the oil/gas separator, which is attached to the line, reaches the atmospheric pressure. To the prepared emulsion of SGN nitrogen salts is added the delayed action activator which is considered appropriate for the waxing extent of the line. The emulsion is then pumped in the direction opposite to the flow of oil from the production platform at a pressure which is near the limiting pressure of the line. During the treating period, the generated gas is withdrawn at intervals, in order to optimize the available heat in the dewaxing. The well is then opened in order to recover the fluidized wax, the produced oil serving to displace the treating fluids (spent saline solution from the treating fluid, together with solvent and paraffin).

As illustrated on FIG. 6, mode C, the emulsified solution to be used in the dewaxing treatment, including the most suitable delayed action activator, is pumped from the production platform to a line attached to the well head by means of an auxiliary line, such as a gas lift line up to the well head. The emulsion returns to the platform through the production line, which is to be dewaxed, and the production riser in a so-called "circulating" system. With this mode, after shutting off the oil flow by means of the master valve and with the cross-over valve open, seawater is pumped through the auxiliary line in order to displace throughout the conduit or production line the oil contained therein. After the period of time necessary for the heat and nitrogen generation and consequent fluidization of the wax, the spent fluids are recovered by pumping a displacing fluid, such as seawater or diesel oil, in the direction of the treatment.

Therefore, the present process provides for the dewaxing of large dimension lines or conduits, one end of which is attached to the production platform, while the other end is linked to a well head via a monobuoy or other equipment, or to a maritime or terrestrial terminal.

The process of the present invention will now be illustrated by way of Examples, which should not be construed as limiting the invention. Insofar as the present process enables one to prolong of the onset of the reaction to generate heat and nitrogen by the use of aliphatic anhydrides of different molecular weights, it is desirable that the delaying action be well characterized, as illustrated in the following Examples. Thus, Examples 1 to 7, accompanied by FIGS. 1 to 5, illustrate on a laboratory scale the effective delay of various poly(adipic anhydrides) on the reaction to generate nitrogen and heat. Example 8 illustrates aspects of the invention, which are more directly related to field operation. Example 9 is a field example. This Example 9 unequivocally demonstrates the very large applicability and practicability of the present process.

EXAMPLES 1 to 7

EXAMPLES 1 to 7, as well as FIGS. 1 to 5, demonstrate the effective delay of the various poly(adipic anhydrides) on the reaction to generate nitrogen and heat (SGN). Poly (adipic anhydrides) of various molecular weights were synthesized according to processes described herein.

The assessment of the poly(adipic anhydride) as a delayed action activator for the SGN reaction is based on the controlled hydrolysis of the product when contacted with the aqueous solution of the emulsified nitrogen salts. This hydrolysis results in depolymerization of the poly(adipic anhydride) and return to the adipic acid monomer. The adipic acid monomer requires a certain period of time to dissolve in the aqueous phase of the SGN system, with release of $H^+$ and onset of the reaction to generate nitrogen and heat. The effect of the poly(adipic) anhydrides on the delay of the onset of the reaction to generate nitrogen and heat generation is illustrated in EXAMPLES 1 to 7 which were obtained in lab-scale experiments according to the following procedure:

In a three-necked flask are placed solutions of the following: 25 ml of a 5M aqueous solution of $NH_4Cl$, 25 ml of a 5M aqueous solution of $NaNO_2$ and 50 ml of kerosene. The reagents do not emulsify. The polyanhydride is produced as agglomerated particles which are milled in the presence of kerosene to produce beads of variable diameter. The preferred granulometry is less than 180 mesh Tyler. The rate of hydrolysis is therefore a function of the particle diameter. For the sake of comparison, the performance of the present activator is compared to that obtained with the use of the state-of-the-art delayed action activator, that is, acetic acid, and also to that of monomeric adipic acid, also an efficient delayed action activator for the SGN reaction.

Performance data are obtained by introducing into one of the necks of the flask containing the solutions, 0.2 g of poly(adipic anhydride) or adipic acid (vs. 0.6 g of acetic acid), another neck carries a thermometer and the third neck is connected to an inverted measuring glass which contains water designed to evaluate the volume of nitrogen gas produced. The reaction is effected in an adiabatic mode, a vacuum being created in a jacket which surrounds the flask. The flask contents are agitated by means of a magnetic stirrer until the first nitrogen gas bubble builds up, after which the magnetic stirring is stopped, the observed turbulence being exclusively due to the nitrogen gas produced by the reaction of the nitrogen salts.

By using the system described hereinbefore, laboratory data illustrated on FIGS. 1 to 5 were obtained, where Example 0 corresponds to the delaying time obtained with acetic acid (according to the prior art), and Example 1 is adipic acid which is the monomer product of the hydrolysis of poly(adipic anhydride) and equally usable as the delayed action activator of the present invention, either per se or admixed to the polyanhydride.

FIGS. 1 to 4 illustrate delaying times for SGN reaction induced by poly(adipic anhydrides) of various molecular weights. It was found that the controlled hydrodegradability of the poly(adipic anhydride) enables one to delay the SGN reaction according to the delay desired for each specific case of line length and internal diameter. The hydrodegradability is a function mainly of the molecular weight of the polyanhydride, higher molecular weights leading to longer hydrodegradation times. TABLE 1 below shows the molecular weights (MW) of the poly (adipic anhydrides) of Examples 2 to 7 as determined using Nuclear Magnetic Resonance (NMR).

TABLE 1

| Example | MW by NMR |
| --- | --- |
| 2 | 1045 |
| 3 | 2930 |
| 4 | 6294 |
| 5 | 758 |
| 6 | 3660 |
| 7 | 5442 |

Figure 1:
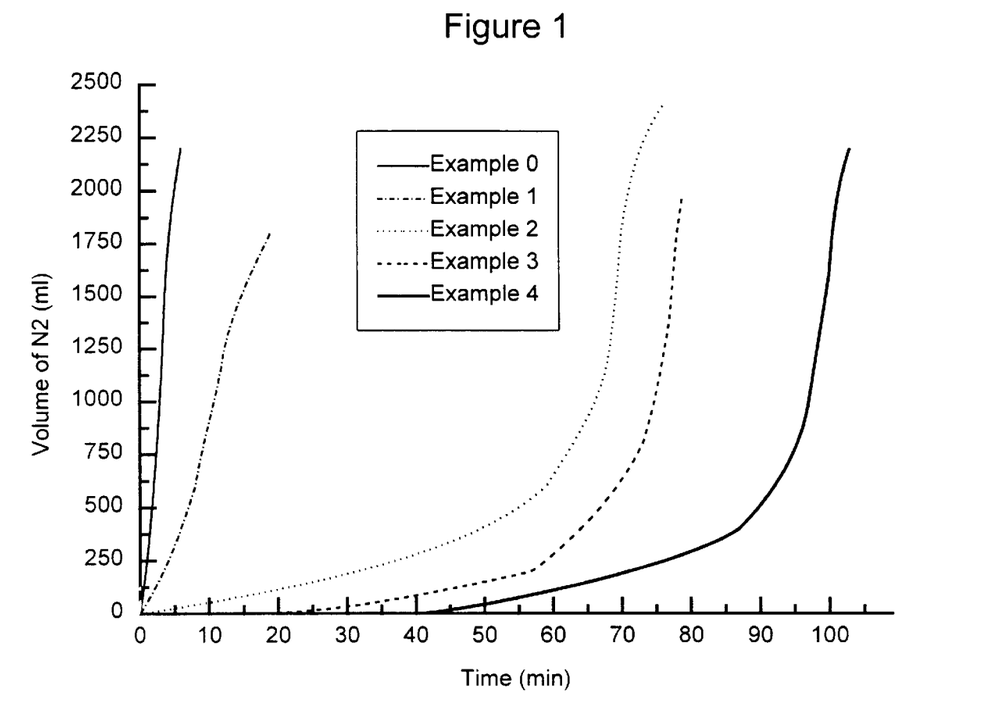
FIG. 1 is a graph illustrating the volume of nitrogen which is generated as a function of the reaction time, for various delayed action poly(adipic anhydride) activators.
Figure 2:
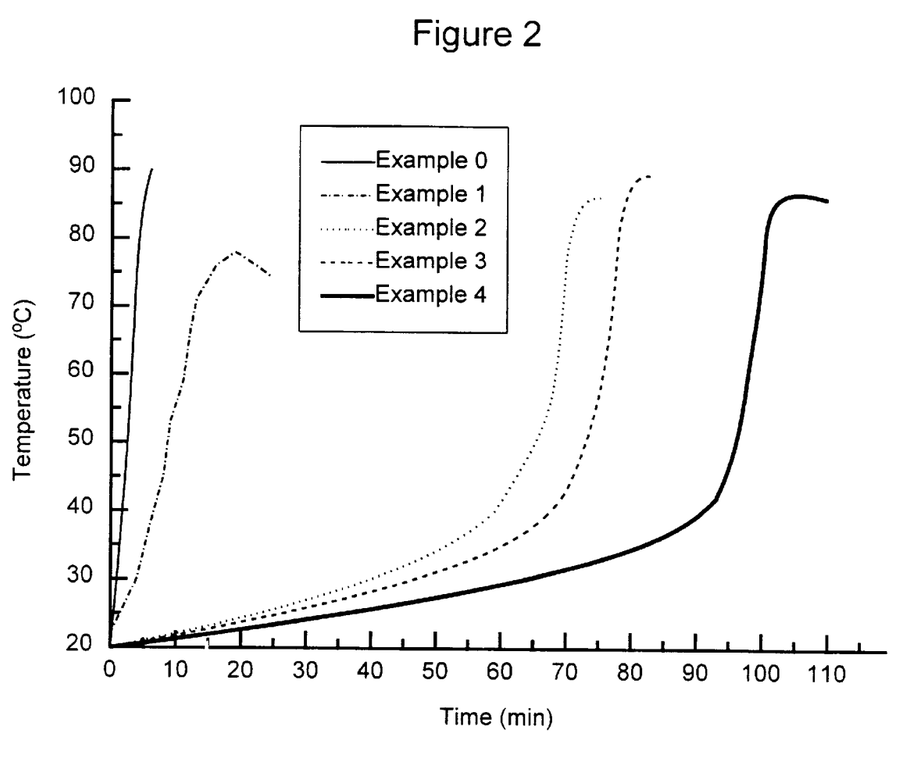
FIG. 2 is a graph illustrating the various temperatures reached from several reaction times for generating nitrogen and heat for the same delayed action poly(adipic anhydrides) illustrated in FIG. 1.
Figure 3:
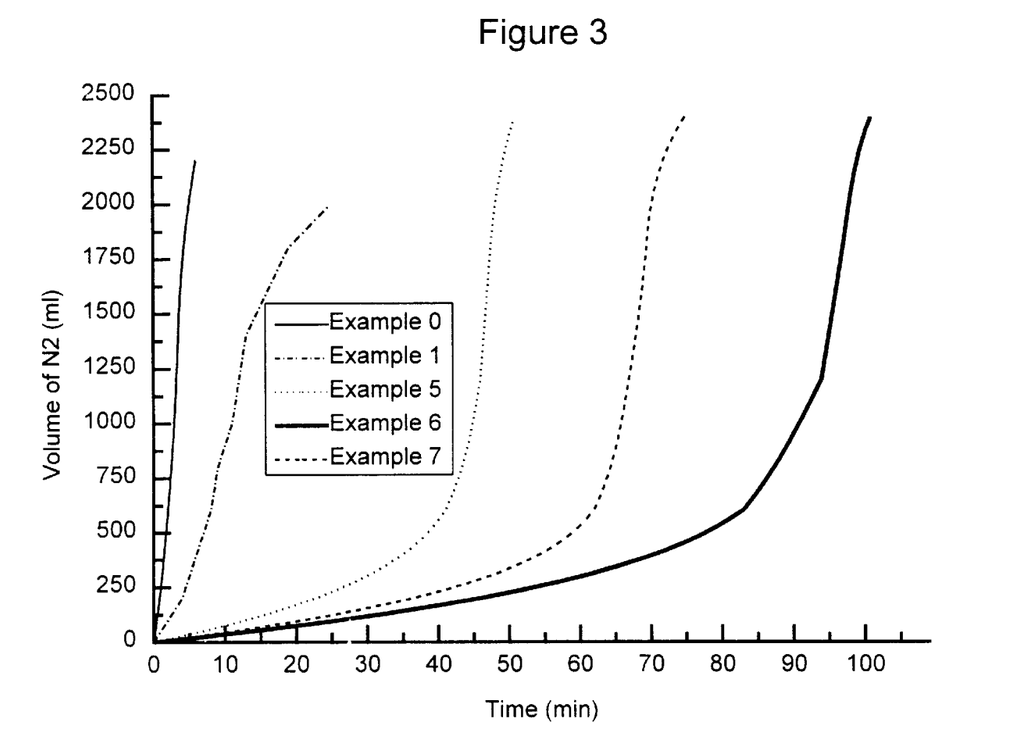
FIG. 3 is a graph illustrating the volume of nitrogen generated as a function of the reaction time for delayed action poly(adipic anhydride) activators not contemplated by FIG. 1.
Figure 4:
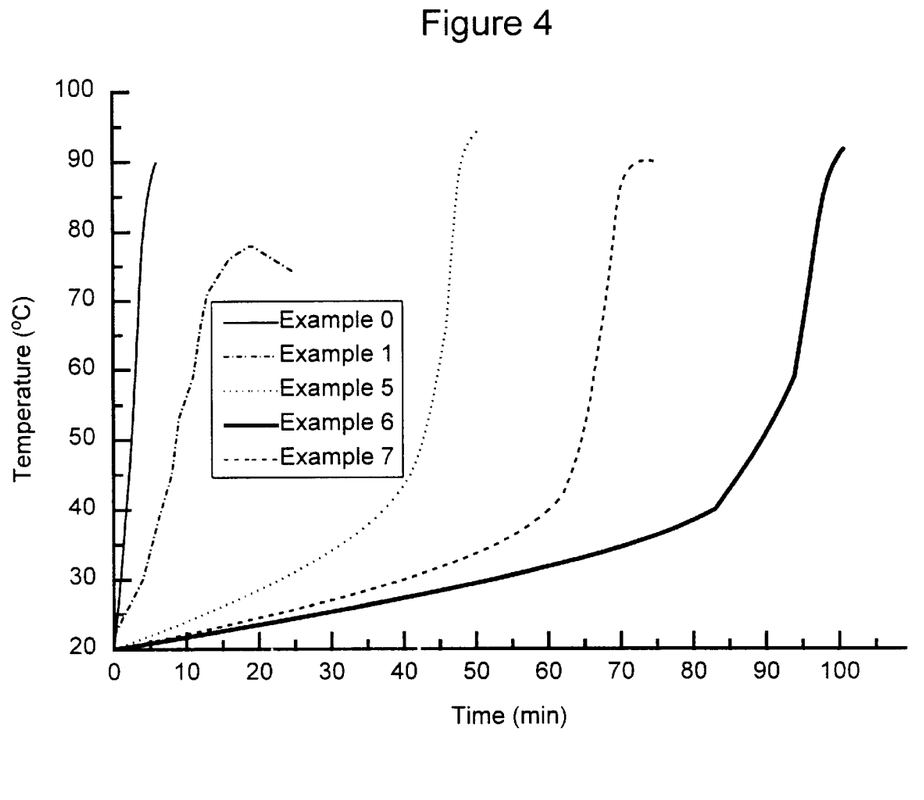
FIG. 4 is a graph illustrating various temperatures reached from the reaction time for generating nitrogen and heat for delayed action poly(adipic anhydride) not contemplated by FIG. 2.
Figure 5:
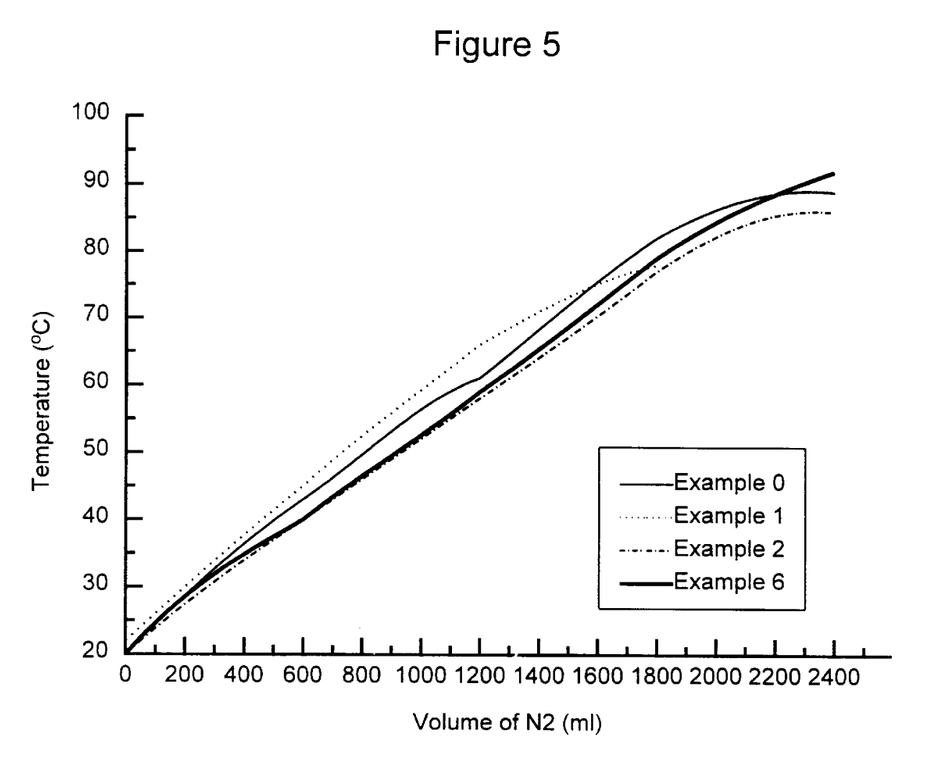
FIG. 5 is a graph showing curves of the temperature reached vs. the volume of nitrogen for various delayed action poly(adipic anhydride).

FIGS. 1 to 4 illustrate the strong delay obtained with the poly(adipic anhydrides) in contrast with the acetic acid and with the adipic anhydride monomer, the increase in delay being a function of the molecular weight of the anhydride. The delay obtained is evaluated on the basis of both (1) the nitrogen volume generated and (2) the attained temperature, both measured as a function of time. FIGS. 1 to 4 demonstrate that it is possible to design the dewaxing treatment for the specific length and internal diameter of the line by choosing the polyanhydride of most suitable molecular weight for the desired delay. This kind of fine control as applied to the dewaxing treatment is believed to be unknown in the prior art and allows large operation flexibility when applying the process in the field. FIG. 5 suggests, for Examples 0, 1, 2 and 6 that, once the delayed action activator is dissolved—this activator being either the acetic acid of the prior art, adipic acid or the polyanhydrides of the present invention—the activation mechanism occurs for all cases through the action of the $H^+$ ion.

EXAMPLE 8

Once the effective action of the polyanhydrides as delayed action activators for the SGN reaction on a laboratory scale is demonstrated, the conditions of use of such polymers in a field scale may be established. Initially, chemical and physical-chemical characterization of the polymer sample previously milled in a roll mill followed by a ball mill and sieves may be determined. More particularly, for data provided herein, average molecular weight is determined using Nuclear Magnetic Resonance, the concentration of active matter is determined by standard gravimetry, apparent viscosity is determined by Brookfield viscometer at 90° C., melting point is determined by Differential Scanning Calorimetry, and the granulometric curve is determined by vibrating sieving.

Table 2 below lists data for the granulometric curve for a typical poly(adipic anhydride) used in the present invention.

TABLE 2

| GRANULOMETRIC (mesh) | RANGE (mm) | % RETAINED (wt %) |
|---|---|---|
| M > 28 | M > 0.595 | 0 |
| 28 > M > 115 | 0.595 > M > 0.15 | 4.2 |
| M < 115 | M < 0.15 | 95.8 |
| TOTAL | | 100.0 |

TABLE 3 below shows the physical-chemical characterization of a poly(adipic anhydride) composition.

TABLE 3

| PROPERTY | |
|---|---|
| Active matter content (wt %/volume) | 17 |
| Ayerage molecular weight (g/mol) | 1996 |
| Brookfield viscosity (cP) @ 90° C. | 584 |
| Melting point (°C.) | 61 |

The kinetic-chemical parameters for the SGN reaction in the presence of the poly (adipic anhydride) in very low concentration as a dispersion in non-polar organic medium were determined in a glass reactor under nearly adiabatic conditions, the temperature and volume of nitrogen gas being simultaneously monitored. TABLE 4 below lists the content of poly (adipic anhydride) for various SGN/poly (adipic anhydride) formulations. In all formulations 40 volume percent of SGN was employed. The SGN was prepared from an aqueous solution of $NH_4Cl$ (produced by Engeclor Industries, Brazil) and $NaNO_2$ (produced by BASF from Brazil) and 60 volumes of aviation fuel (kerosene) (produced by PETROBRAS DISTRIBUIDORA). The concentration of each of the nitrogen salts being 4.5 molar. 0.1 volume percent of non ionic lipophilic emulsifier ATPET 200 (produced by Ultra guimica, Brazil) was added. The poly(adipic anhydride) was suspended in aviation fuel at 17 wt %/volume.

TABLE 4

| FORMLATION SGN/ POLY (ADIPIC ANHYDRIDE) | VOL % POLY(ADIPIC (ANHYDRIDE) |
|---|---|
| 1 | 0.6 |
| 2 | 0.7 |
| 3 | 0.8 |
| 4 | 0.9 |
| 5 | 1.0 |
| 6 | 1.1 |

Poly(adipic anhydride) was used in the above concentrations to activate the reaction to generate nitrogen and heat. The kinetics of this reaction was determined for the initial temperatures of 20° C. and 10° C. The results are listed on TABLE 5 below.

TABLE 5

| FORMU-LATION | INITIAL T (°C.) | DELAYING PERIOD (min) | MAX. TEMP. (°C.) | REACTION RATE x $10^5$ (% mol/min) |
|---|---|---|---|---|
| 1 | 20 | 175 | 63 | 0.67 |
| 2 | 20 | 102 | 74 | 10.1 |
| 3 | 20 | 82 | 97 | 17.6 |
| 4 | 20 | 75 | 99 | 18.4 |
| 5 | 20 | 58 | 100 | 25.1 |
| 2 | 10 | 186 | 54 | <0.1 |
| 3 | 10 | 127 | 67 | <0.1 |
| 4 | 10 | 109 | 75 | 1.62 |
| 5 | 10 | 98 | 86 | 8.87 |
| 6 | 10 | 61 | 89 | 13.31 |

The values of the kinetic parameters of TABLE 5 were converted into reaction constants A and B according to a mathematical model developed by the Applicant, which in turn were applied in the mathematical simulation model SGNL3 designed to effect the prediction of the thermodynamical behavior of SGN under the operation conditions.

TABLE 6 below lists the kinetic-chemical parameters for a few SGN/POLY(ADIPIC ANHYDRIDE) activators.

TABLE 6

| FORM. | I. TEMP (°C.) | pH OF EMULSION | | SP. GRAVITY (kg/m³) | | R. CONSTANT | | NITROGEN GENERATION | |
|---|---|---|---|---|---|---|---|---|---|
| | | In. | Finial | In. | Final | A | B | (mol/l) | (% mol) |
| 1 | 20 | 4.9 | 5.8 | 936 | 924 | -42.8 | +4179 | 0.401 | 22.3 |
| 2 | 20 | 4.8 | 5.7 | 936 | 902 | -7.65 | -5815 | 1.205 | 66.9 |
| 3 | 20 | 4.7 | 5.7 | 936 | 897 | -12.7 | -4069 | 1.396 | 77.5 |
| 4 | 20 | 4.6 | 5.6 | 936 | 894 | -25.4 | -3145 | 1.503 | 83.5 |
| 5 | 20 | 4.5 | 5.5 | 936 | 890 | -13.4 | -3770 | 1.634 | 90.8 |
| 4 | 10 | 4.6 | 5.6 | 936 | 903 | -13.1 | -4469 | 1.17 | 65.1 |
| 5 | 10 | 4.5 | 5.5 | 936 | 900 | -12.7 | -4295 | 1.27 | 70.5 |
| 6 | 10 | 4.4 | 5.4 | 936 | 894 | -15.2 | -3341 | 1.51 | 83.3 |

The results listed above demonstrate that poly (adipic anhydrides) can be successfully employed as delayed action activators in the reaction to generate heat and nitrogen. More specifically, the desired delay can be dimensioned as a function of the granulometry of the activator, as well as by the initial temperature encountered by the emulsions in the interior of the line. Therefore, the use of the poly (adipic anhydrides) renders the present process extremely versatile.

From laboratory and field data a simulation is made for applying the mechanism of chemical reaction control in the presence of poly (adipic anhydrides) to the dimensioning of the dewaxing operation of the section of production line between the wet Christmas tree of 4-RJS-438-RJS well and the production platform.

The well site is in the Bijupirá Field in the Campos Basin, Rio de Janeiro, Brazil. In this specific case, the closed loop or circulating mode of treatment should be used, the pumping of treating fluid being effected from the production platform using an auxiliary line such as a gas lift line up to the well wet Christmas tree and returning to the platform through the waxed production line and the production riser. FIG. 6C represents such a situation. The production line section to be treated is 4638 meters long and has internal diameter of 6 inches. TABLE 7 below lists data obtained from mathematical simulation for the dewaxing of the referred to section of production line.

TABLE 7

| DATA OF THE SUBSEA ARRANGEMENT | |
|---|---|
| FIELD | BIJUPIRÁ |
| WELL | 4-RJS-438-RJS |
| PLATFORM | SS-20 @ WATER DEPTH 730 m |
| GAS LIFT LINE | 834 m @ I.D. = 6.35 cm (2.5 in) |
| | 4648 m @ I.D. = 10.16 cm (4.0 in) |
| CAPACITY | 40.3 $m^3$ |
| WET CHRISTMAS TREE | RJS-438 @ WATER DEPTH = 745 m |
| PRODUCTION LINE | 4648 m @ I.D. = 15.24 cm (6 in) |
| CAPACITY | 92.5 $m^3$ |
| PRODUCTION RISER | 866 m @ I.D. = 10.16 cm (4 in) |
| CAPACITY | 7.0 $m^3$ |
| WAXING PREDICTION | |
| GAS LIFT LINE | 0% |
| PRODUCTION LINE | 30% |
| PRODUCTION RISER | 0% |
| WAX TOTAL VOLUME | 27.7 $m^3$ |
| WAX CONDUCTIVITY | 0.32 W/m · °C. |
| WAX SPECIFIC GRAVITY | 0.90 kg/l |
| WAX SPECIFIC HEAT | 0.460 kJ/kg · °C. |
| WAX AVERAGE THICKNESS | 12.4 mm |
| PRE-DIMENSIONING OF THE OPERATION | |
| FORMULATION OF THE TREATING FLUID | SGN-ACTIVATOR N°5 |
| ORGANIC SOLVENT | KEROSENE |
| SOLVENT/SOLUTION C + N RATIO | 60/40 VOL/VOL |
| MOLE CONCENTRATION | 1.80 mol/l |
| CONC. OF ACTIVATOR AT 17% | 1.2% (estimated) |
| DELAYING TIME @ 20° C. | 58 min |
| DELAYING TIME @ 10° C. | 98 min |
| INITIAL pH | 4.6 |
| FINAL pH | 5.4 |
| SPECIFIC HEAT | 2960 kJ/kg · °C. |
| SPECIFIC GRAVITY | 936 kg/$m^3$ |
| "A" CONSTANT | −12.7 @ 10° C. |
| "B" CONSTANT | −4295 @ 10° C. |
| FINAL NITROGEN | 1.27 mol/l |
| VOLUME USED IN THE TREATMENT | 74.73 $m^3$ (470 bbl) |
| DISPLACEMENT VOLUME | 39.75 $m^3$ (250 bbl) |
| PUMPING FLOWRATE | (0.95 $m^3$/min (6 bpm) (estimated) |
| PUMPING TIME | 42 min @ up to the WET C. T. |
| PUMPING TIME | 170 min @ up to SS-20 |
| REST PERIOD AFTER PUMPING | 70 min |
| RESULTS OF SIMULATION | |
| VOLUME PUMPED | 114.46 $m^3$ (720 bbl) |
| PUMPING FLOWRATE | 0.95 $m^3$/min (6 bpm) |
| OPERATION PERIOD | 190 min (pumping + rest period) |
| MAX. TEMPERATURE | 113° C. @ 10,000 m; 129 min |
| MAX. PRESSURE | 114.80 kg/$cm^2$ (1640 psig) |
| | @ 1130 m; 117 min. |
| PARAFFIN WITHDRAWAL | 100% |
| COMPOSITION OF GSN/ACTIVATOR | (75 $m^3$) |
| C + N SOLUTION | (30 $m^3$) |
| INDUSTRIAL WATER | 19.5 $m^3$ |
| SODIUM NITRITE | 9315 kg |
| AMMONIUM CHLORIDE | 7222 kg |
| SODIUM HYDROXIDE | 75 kg |
| SGN/EMULSION | (65.0 $m^3$) |
| C + N SOLUTION | 30.0 $m^3$ |
| KEROSENE | 35.0 $m^3$ |
| EMULSIFIER (ATPET) | 65 liters |
| ACTIVATOR SUSPENSION/DIESEL | (10 $m^3$) |
| DIESEL | 9.7 $m^3$ |

TABLE 7-continued

| | |
|---|---|
| ACTIVATOR - 52% | 295 liters (or 153 kg 100% ACTIVATOR) |
| SGN/ACTIVATOR ON FLOW | (75 m$^3$) |
| GSN/EMULSION | 65 m$^3$ |
| ACTIVATOR SUSPENSION/DIESEL | 10 m$^3$ |

Therefore, the improved process for the dewaxing of hydrocarbon conduits or lines of the present process as applied in the field involves the simultaneous pumping of the main fluid, that is, SGN/Emulsion—and a concentrated suspension of the poly (adipic anhydride) (activator) in an organic solvent, so as to promote the delayed onset of the activation of reaction, preferably after the pumping has ceased. This way the SGN bed is adequately positioned in the section to be dewaxed, before the onset of the nitrogen generation reaction, with a greater profit from the generated heat, as well as better industrial safety.

Simulation of the dewaxing operation using mathematical simulation method SGNL3 leads to the prediction of the optimum volumes of treating fluid (74.73 m$^3$ or 470 bbl of SGN/ACTIVATOR) and displacement fluid (39.75 m$^3$ or 250 bbl of maritime diesel) to fill in the gas lift line and position the SGN bed in the 4648 meters section between the well Wet Christmas Tree (WCT) and the lower end of the production riser. The degree of waxing has been considered to be 30% of the volume of the production line, which corresponds to a mass of 25 tons. For operation safety reasons, maritime diesel has been chosen as the organic solvent, which led to the need of a higher activator concentration (activator suspension at 17%) from 1.0 to 1.2% by volume of the SGN/Emulsion fluid.

If a delaying period of 98 minutes is contemplated for the nitrogen generation reaction, the pumping of 114.46 m$^3$ (720 bbl) (SGN+ diesel) at a flowrate of 0.95 m$^3$/min (6 bpm) leads to an overall pumping period of 120 minutes. This operation condition should provide a nearly ideal performance of the SGN fluid in the waxed section, there being the complete removal of the wax deposit through an irreversible fluidizing process. According to the mathematical simulation, values for temperature and maximum pressure should not be higher than, respectively, 113° C. and 114.80 kg/cm$^2$ (1640 psig) throughout the operation.

The volume of treating solution to be used in the Bijupirá platform, estimated as 75 m$^3$, will be obtained from nearly 9.3 tons of sodium nitrite, 7.2 tons of ammonium chloride and 153 kg of activator supplied in the form of a concentrated suspension in kerosene.

The on-flow evaluation of the activator during SGN pumping (calculated as 0.2% weight/volume) will be defined from a pilot test to be effected in situ with samples collected from the mixing tanks. New samples will also be collected during the operation, aiming at monitoring the placement of additives on flow and the establishment of the rest period and further recovery of the fluids involved (that is, SGN/emulsion and wax).

EXAMPLE 9

Having the above data at hand, the dewaxing operation of the subsea production line of the Bijupirá field (RJS-438) was effected using the poly(adipic anhydride) of Example 5 as activator of the SGN reaction. A delay of 75 minutes was obtained before the onset of the reaction to generate heat and nitrogen. The production line was treated with 75 m$^3$ of SGN/Emulsion to which were added 155 kg of poly(adipic anhydride) of Example 5. Operation was successful, with 36 tons of paraffin being removed. Prior to the removal, this paraffin was contained in the 4650 meters of the section of the line near the WCT at water depth 750 meters. The sea temperature was 4° C. After the dewaxing treatment using the present process, the flowrate of oil reached 700 m$^3$ a day, against 479 m$^3$ a day produced in the waxed condition of the line.

It should be pointed out that the method for the thermo-chemical dewaxing of lines according to the present specification and claims is suited for a large-dimension waxed line connected to a production platform and to the production well, as well as for a large-dimension waxed line connected to oil-storage equipment to be collected by a ship, and for a large-dimension line connected to any other production equipment.

What is claimed is:

1. A method for the thermo-chemical dewaxing of a hydrocarbon transmission conduit containing paraffin deposit, said method comprising the steps of:

(a) introducing into said conduit an emulsion comprising an internal aqueous phase and an external organic phase, said aqueous phase comprising an oxidizing nitrogen salt, a reducing nitrogen salt and water, and said organic phase comprising a non-polar organic liquid, said emulsion comprising a delayed action activator for inducing the reaction of said oxidizing nitrogen salt and said reducing nitrogen salt, wherein said delayed action activator is a linear, aliphatic polyanhydride, said polyanhydride being insoluble in the organic phase as well as the aqueous phase;

(b) maintaining said emulsion in said conduit under conditions sufficient to fluidize paraffin deposit and to generate nitrogen gas and heat from the reaction of said oxidizing nitrogen salt and said reducing nitrogen salt; and (c) removing the fluidized paraffin deposit from said conduit.

2. A method according to claim 1, wherein one end of the hydrocarbon transmission conduit is connected to a production platform, and wherein hydrocarbon oil contained in said conduit is withdrawn from said conduit prior to pumping said emulsion into said conduit.

3. A method according to claim 2, wherein said emulsion is pumped into said conduit via a dynamic positioning rig in a direction co-current to the direction of oil production.

4. A method according to claim 2, wherein said emulsion is pumped into said conduit from said production platform in a direction counter-current to the direction of oil production.

5. A method according to claim 2, wherein said emulsion is pumped into said conduit through an auxiliary line connected to the production platform; wherein said conduit, said auxiliary line and said production platform and the well head comprise a circulating system through which said emulsion is pumped and spent fluids are withdrawn.

6. A method according to claim 2, wherein said oxidizing nitrogen salt is sodium nitrite and said reducing nitrogen salt is ammonium chloride, and wherein the concentration of the aqueous solution comprising these salts is between 3.0 and 4.5 molar for each of these salts.

7. A method according to claim 6, wherein said solution comprising said salts further comprises NaOH, and wherein the pH of said solution is maintained between 7.0 and 7.5 to stabilize said solution prior to the reaction to generate heat and nitrogen.

8. A method according to claim 6, wherein said non-polar organic liquid is aviation kerosene, maritime diesel or mixtures thereof.

9. A method according to claim 6, wherein one end of the hydrocarbon transmission conduit is connected to a production platform, and wherein the aqueous solution of oxidizing nitrogen salt and reducing nitrogen salt is prepared in a single vessel on the production platform.

10. A method according to claim 1, wherein said linear, aliphatic polyanhydride is poly(adipic anhydride).

11. A method according to claim 10, wherein the concentration of the poly(adipic anhydride) is between 0.4 and 1.5% by volume based on the volume of the aqueous solution of oxidizing and reducing nitrogen salts, and wherein the concentration of said poly(adipic anhydride) based on said non-polar organic liquid is between 10 and 20% weight/volume.

12. A method according to claim 10, wherein said poly(adipic anhydride) is prepared by a process comprising the steps of:

(1) forming a reaction mixture comprising adipic acid and an excess of acetic anhydride;

(2) maintaining the reaction mixture of step (1) under pre-polymerization conditions comprising atmospheric pressure and reflux temperature to form a pre-polymer and acetic acid by-product;

(3) cooling the reaction mixture of step (2);

(4) withdrawing acetic acid by-product and unreacted acetic anhydride from the reaction mixture of step (3) under reduced pressure; and (5) increasing the temperature of the reaction mixture of step (4) to effect polymerization of said pre-polymer.

13. A method according to claim 11, wherein the molecular weight of said poly(adipic anhydride) is between 500 and 7000, the melting point of said poly(adipic anhydride) is between 55° and 85° C. and the Brookfield viscosity of said poly(adipic anhydride) at 90° C. is between 500 and 700 cP.

14. A method according to claim 1, wherein said linear aliphatic polyanhydride is selected from the group consisting of poly(glutaric anhydride), poly(pimelic anhydride), poly(suberic anhydride), poly(azelaic anhydride) and poly(sebacic anhydride).

* * * * *